US012705168B2

(12) United States Patent
Roberts

(10) Patent No.: US 12,705,168 B2
(45) Date of Patent: Aug. 11, 2026

(54) NEAR-MEMORY TIME-SYNCHRONIZED TELEMETRY LOGGING

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/768,240

(22) Filed: Jul. 10, 2024

(65) Prior Publication Data

US 2026/0017182 A1 Jan. 15, 2026

(51) Int. Cl.
*G06F 12/00* (2006.01)
*G06F 12/02* (2006.01)
*G06F 13/42* (2006.01)

(52) U.S. Cl.
CPC ...... *G06F 12/0223* (2013.01); *G06F 13/4221* (2013.01); *G06F 2213/0026* (2013.01)

(58) Field of Classification Search
CPC ............. G06F 12/0223; G06F 13/4221; G06F 2213/0026
See application file for complete search history.

(56) References Cited

U.S. PATENT DOCUMENTS 8,117,356 B1 * 2/2012 Narad ..................... H04L 45/60 710/22
2018/0074973 A1 * 3/2018 Chan ....................... G06F 11/00
2020/0136994 A1 * 4/2020 Doshi ................. G06F 16/1865
2022/0405185 A1 * 12/2022 Joshi ........................ G06F 9/542
2023/0246908 A1 * 8/2023 Iwai ........................ G06F 13/00 709/223
2023/0315630 A1 * 10/2023 Alam .................. G06F 12/0804 711/122
2024/0338132 A1 * 10/2024 Bresniker ............... G06F 3/067
2024/0393848 A1 * 11/2024 Chan ............. G01R 31/318519
2024/0403205 A1 12/2024 Roberts
2025/0130776 A1 * 4/2025 Vaknin .................... G06F 21/62
2025/0165372 A1 * 5/2025 Jaliminche .......... G06F 12/0868
2025/0272235 A1 8/2025 Roberts
2025/0298712 A1 9/2025 Roberts

FOREIGN PATENT DOCUMENTS

WO WO-2024238994 A1 * 11/2024 ............ B01L 3/5085

OTHER PUBLICATIONS

Roberts, David A. “Utilizing Data Embedded in Address Streams”, U.S. Appl. No. 18/799,622, filed Aug. 9, 2024, 79 pages.

* cited by examiner

*Primary Examiner* — Shawn X Gu
*Assistant Examiner* — Mohammad S Hasan
(74) *Attorney, Agent, or Firm* — Schwegman Lundberg & Woessner, P.A.

(57) ABSTRACT

A memory controller of a memory device can receive an insertion notification related to near-memory telemetry data, and can collect the near-memory telemetry data based on the insertion notification. The near-memory telemetry data can be included in a log stored in a memory array of the memory device, and the logged near-memory telemetry data can be sent to a host device, in some examples.

18 Claims, 8 Drawing Sheets

NEAR-MEMORY TIME-SYNCHRONIZED TELEMETRY LOGGING

TECHNICAL FIELD

Embodiments of the disclosure relate generally to managed memory devices.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems (e.g., often non-volatile memory, such as flash memory) that provide additional storage to retain data in addition to or separate from the main memory.

A memory device can include a memory controller and one or more memory devices, including a number of dies or logical units (LUNs). The dies can be configured into one or more memory arrays. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, or can perform drive management operations (e.g., data migration, garbage collection (GC), block retirement), etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Software (e.g., programs), instructions, operating systems (OS), and other data are typically stored on storage systems and accessed by main memory for use by a host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different levels of volatile memory, such as a group of static memory (e.g., a cache, often SRAM), often faster than the main memory, in certain examples, configured to operate at speeds close to or exceeding the speed of the host processor, but with lower density and higher cost. In other examples, more or less levels or quantities of main memory or static memory can be used, depending on desired host system performance and cost.

Programmers or system managers may want to monitor and log memory-side internal metadata and other internal telemetry data without the data crossing the interface between host devices and main memory device modules. This monitoring and logging provides information regarding behavior of programs and memory performance when executing the programs.

It would be useful to include memory-side internal telemetry metadata (near-memory telemetry) in a trace, for example, similarly to the way a host can record its own metadata. The present subject matter provides, among other things, new commands to insert memory device-side telemetry data into a log in response to the new commands. Examples of the memory device-side telemetry data include interface and internal memory bandwidth and latency measurements, device queue occupancy, memory-side cache hit rates and near-memory computing (NMC) telemetry data that may be self-generated by a user-defined function. Other types of memory device-side telemetry data may be monitored and logged without departing from the scope of the present subject matter.

Figure 1:
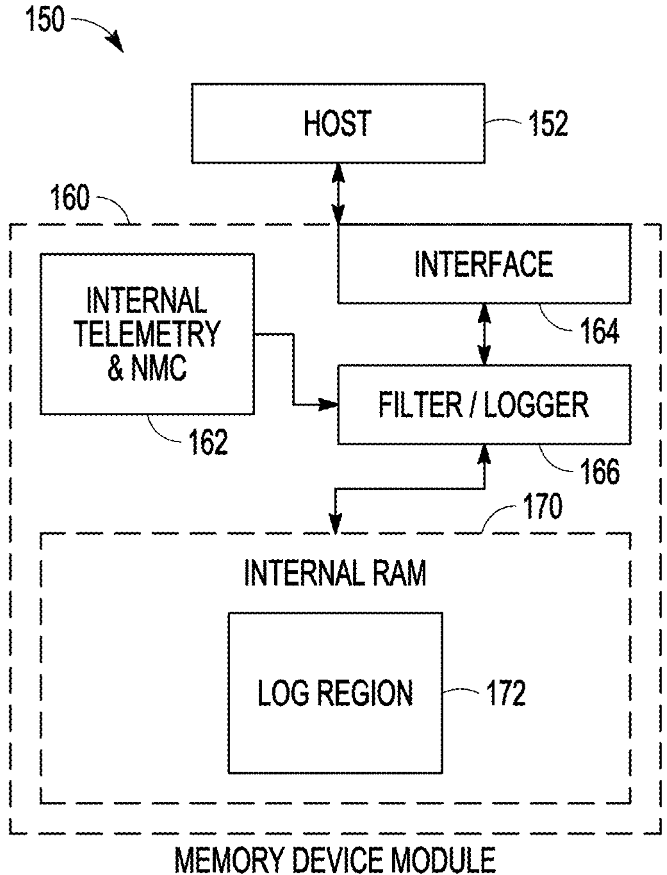
FIG. 1 illustrates an example of a system including a memory device having embedded near-memory time-synchronized telemetry logging.

FIG. 1 illustrates an example of a system including a memory device having embedded near-memory time-synchronized telemetry logging. The system 150 includes a host 152 and one or more memory device modules 160 in communication with the host. The memory device modules 160 include an interface 164, a filter/logger 166, and internal random access memory (RAM) 170 including a log region 172. The filter/logger 166 may include selection criteria for determining request and response packet fields to write to the log region 172. According to various embodiments, the memory device modules 160 include internal telemetry and one or more near-memory computing (NMC) processors 162. The internal telemetry may include general telemetry units for near-memory telemetry including, but not limited to, bandwidth, latency, request counts and/or temperature. The NMC processors 162 are configured to communicate with the filter/logger 166 and may include processors for internal firmware, externally programmable NMC, or NMC specifically for post-processing other telemetry and log information, in various embodiments.

According to various embodiments, the present system receives a triggering command such as a special memory request from the host 152 (e.g., to a metadata register), a programmable timer on the memory device modules 160, a decision by an NMC processor 162, or an encoded sequence of addresses from the host 152. The triggering command, also referred to herein as an insertion notification, triggers insertion of device-internal metadata into the log region 172.

In various examples, the triggering command includes a) an indication of what subset or type of near-side telemetry data is to be inserted in the log, and b) a unique identifier so that current code execution can be aligned to the recorded telemetry data. The unique identifier (ID) may include a host process program counter (PC) and process ID (PID), or a programmer-defined unique ID, in some examples. The specified telemetry data is inserted into the log as a record tagged with its unique ID, such that it is ordered with respect to the other packets being logged, in various examples.

The triggering command or insertion notification may trigger generation of telemetry data. In an example, a device-side processor, such as the NMC processor 162 can be pre-programmed by a user to generate advanced or complex telemetry data.

The present subject matter enables precise logging of memory-side telemetry data without the data crossing the interface (e.g., a compute express link (CXL) interface), thereby improving performance and the ability to directly map events occurring in user code (e.g., a running function or loop iteration) with detailed insight into memory-side performance and activity. The near-memory protocol packet logger provides for offline or online analysis, which can guide software optimizations or drive runtime system optimizations. The logger filters then records packets of interest into a portion of memory. The user may embed metadata in the trace that is precisely aligned with the normal flow of memory traffic using either a reserved memory address (register) or a sequence of memory addresses, in various examples.

Figure 2:
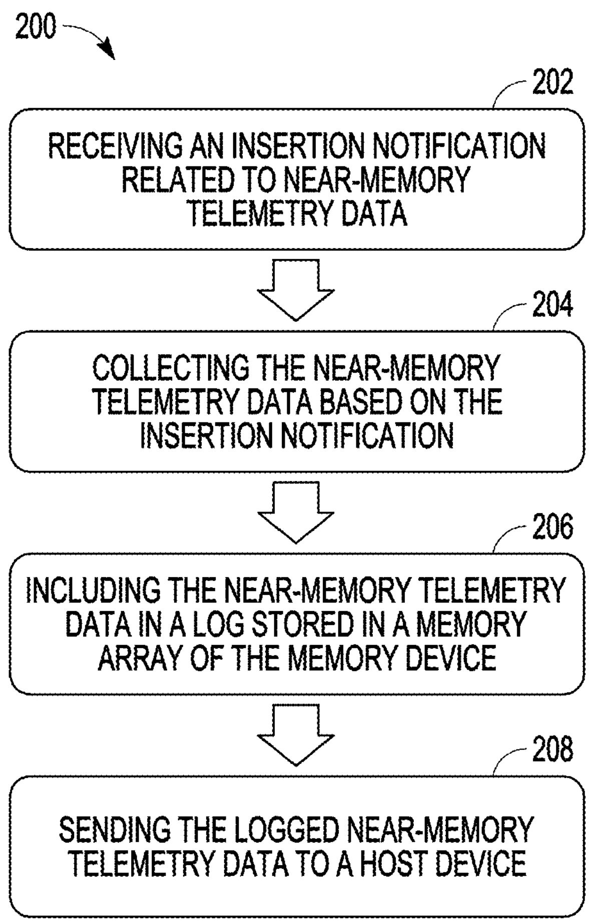
FIG. 2 illustrates an example method for embedded near-memory time-synchronized telemetry logging.

FIG. 2 illustrates a flow diagram of a method 200 for embedded near-memory time-synchronized telemetry logging. In various embodiments, the telemetry logging may be accomplished using one or more memory device modules (e.g., the one or more memory device modules 160 in FIG. 1).

At block 202, an insertion notification is received related to near-memory telemetry data. In some examples, the insertion notification is based on a special memory request from the host device. The insertion notification can be based on a programmable timer of the memory device, in an example. In various examples, the insertion notification is based on a decision of a near-memory computing (NMC) device. The insertion notification includes an encoded sequence of addresses from the host device, in some examples.

At block 204, the near-memory telemetry data is collected based on the insertion notification. In some examples, the insertion notification includes an indication of a type of telemetry data to be collected. The insertion notification includes an indication of a subset of telemetry data to be collected, in some examples. In various examples, the near-memory telemetry data includes one or more of interface or internal memory bandwidth measurements. The near-memory telemetry data includes one or more of interface or internal memory latency measurements, in some embodiments. In various embodiments, the near-memory telemetry data includes queue occupancy of the memory device. The near-memory telemetry data includes a memory-side cache hit rate, in various embodiments. In some examples, the near-memory telemetry data includes near-memory computing (NMC) telemetry data self-generated by a user-defined function.

At block 206, the near-memory telemetry data is included in a log stored in a memory array of the memory device. In various examples, the insertion notification includes a unique identifier (ID) configured to align current code execution with the near-memory telemetry data. The unique identifier includes a host process program counter (PC) and process identification (PID), in some examples. In some examples, the unique identifier includes a programmer-defined unique sequence. The near-memory telemetry data is tagged with the unique identifier when inserting the near-memory telemetry data in the log, in some examples.

At block 208, the logged near-memory telemetry data is sent to the host device. The near-memory telemetry data can be returned to the host device by a load command from the program. The program is given access to its own log data by default. In some examples, the memory device includes a log status register for the log, and can indicate a log full status using the log status register. The host device may read the status register and retrieve the near-memory telemetry data stored in the log at any time, or in response to the log being full. In some examples, the memory device sends an interrupt to the host device and the host device reads the log data in response to the interrupt.

According to various embodiments, a memory device is provided that includes one or more integrated circuit (IC) memory dies or modules configured as a memory array. The memory device also includes a memory controller to control access to the memory array, the memory controller configured to execute instructions to perform any of the methods disclosed herein, such as the method described in FIG. 2.

In various embodiments, a computer system is provided including at least one host device including a host processor, a memory bus and a host input/output (I/O) channel, and at least one memory device coupled to the at least one host device by the memory bus and host I/O channel. The at least one memory device includes one or more integrated circuit (IC) memory dies configured as a memory array, and a memory controller to control access to the memory array, the memory controller configured to execute instructions to perform any of the methods disclosed herein, such as the method described in FIG. 2.

According to various examples, at least one machine-readable medium is provided including instructions that, when executed by processing circuitry, cause the processing circuitry to perform operations to implement any of the methods disclosed herein, such as the method described in FIG. 2.

Compute Express Link (CXL) is an open standard interconnect configured for high-bandwidth, low-latency connectivity between host devices and other devices such as accelerators, memory devices, memory buffers, and other I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, or other accelerators that can be coupled using a CXL link.

CXL supports dynamic multiplexing using a set of protocols that includes input/output (CXL.io, based on PCIe), caching (CXL.cache), and memory (CXL.memory or CXL.mem) semantics. In an example, CXL can be used to maintain a unified, coherent memory space between the CPU (e.g., a host device or host processor) and any memory on the attached CXL device. This configuration allows the CPU and the CXL device to share resources and operate on the same memory region for higher performance, reduced data movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner supports CXL. Devices and platforms can thus more readily adopt CXL by leveraging the PCIe infrastructure and without having to design and validate the PHY, channel, channel extension devices, or other upper layers of PCIe.

In an example, CXL supports single level switching to enable fan-out to multiple devices. This enables multiple devices in a platform to migrate to CXL, while maintaining backward compatibility and the low-latency characteristics of CXL. In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance.

Figure 3:
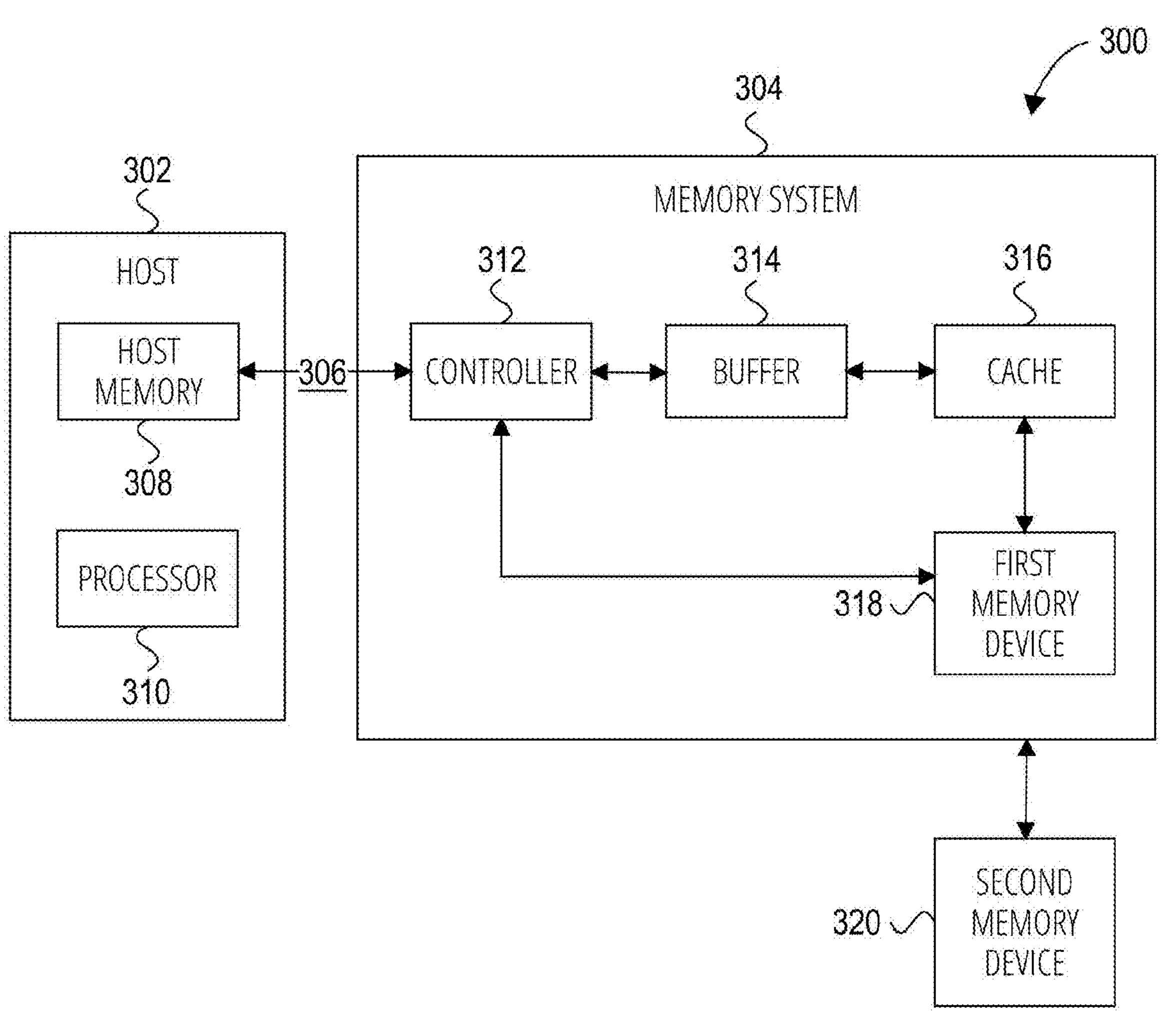
FIG. 3 illustrates generally a block diagram of an example computing system including a host and a memory system.

FIG. 3 illustrates generally a block diagram of an example of a computing system 300 including a host device 302 and a memory system 304. The host device 302 includes a central processing unit (CPU) or processor 310 and a host memory 308. In an example, the host device 302 can include a host system such as a personal computer, a desktop computer, a digital camera, a smart phone, a memory card reader, and/or Internet-of-things enabled device, among various other types of hosts, and can include a memory access device, e.g., the processor 310. The processor 310 can include one or more processor cores, a system of parallel processors, or other CPU arrangement.

The memory system 304 includes a controller 312, a buffer 314, a cache 316, and a first memory device 318. The first memory device 318 can include, for example, one or more memory modules (e.g., single in-line memory modules, dual in-line memory modules, etc.). The first memory device 318 can include volatile memory and/or non-volatile memory, and can include a multiple-chip device that comprises one or multiple different memory types or modules. In an example, the computing system 300 includes a second memory device 320 that interfaces with the memory system 304 and the host device 302.

The host device 302 can include a system backplane and can include a number of processing resources (e.g., one or more processors, microprocessors, or some other type of controlling circuitry). The computing system 300 can optionally include separate integrated circuits for the host device 302, the memory system 304, the controller 312, the buffer 314, the cache 316, the first memory device 318, the second memory device 320, any one or more of which may comprise respective chiplets that can be connected and used together. In an example, the computing system 300 includes a server system and/or a high-performance computing (HPC) system and/or a portion thereof. Although the example shown in FIG. 3 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In an example, the first memory device 318 can provide a main memory for the computing system 300, or the first memory device 318 can comprise accessory memory or storage for use by the computing system 300. In an example, the first memory device 318 or the second memory device 320 includes one or more arrays of memory cells, e.g., volatile and/or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 318 includes persistent or non-volatile memory, the first memory device 318 can include a flash memory device such as a NAND or NOR flash memory device. The first memory device 318 can include other non-volatile memory devices such as non-volatile random-access memory devices (e.g., NVRAM, ReRAM, FeRAM, MRAM, PCM), memory devices such as a ferroelectric RAM device that includes ferroelectric capacitors that can exhibit hysteresis characteristics, a 3-D Crosspoint (3D XP) memory device, etc., or combinations thereof.

In an example, the controller 312 comprises a media controller such as a non-volatile memory express (NVMe) controller. The controller 312 can be configured to perform operations such as copy, write, read, error correct, etc. for the first memory device 318. In an example, the controller 312 can include purpose-built circuitry and/or instructions to perform various operations. That is, in some embodiments, the controller 312 can include circuitry and/or can be configured to perform instructions to control movement of data and/or addresses associated with data such as among the buffer 314, the cache 316, and/or the first memory device 318 or the second memory device 320.

In an example, at least one of the processor 310 and the controller 312 comprises a command manager (CM) for the memory system 304. The CM can receive, such as from the host device 302, a read command for a particular logic row address in the first memory device 318 or the second memory device 320. In some examples, the CM can determine that the logical row address is associated with a first row based at least in part on a pointer stored in a register of the controller 312. In an example, the CM can receive, from the host device 302, a write command for a logical row address, and the write command can be associated with second data. In some examples, the CM can be configured to issue, to non-volatile memory and between issuing the read command and the write command, an access command associated with the first memory device 318 or the second memory device 320. In some examples, the CM can issue, to the non-volatile memory and between issuing the read command and the write command, an access command associated with the first memory device 318 or the second memory device 320.

In an example, the buffer 314 comprises a data buffer circuit that includes a region of a physical memory used to temporarily store data, for example, while the data is moved from one place to another. The buffer 314 can include a first-in, first-out (FIFO) buffer in which the oldest (e.g., the first-in) data is processed first. In some embodiments, the buffer 314 includes a hardware shift register, a circular buffer, or a list.

In an example, the cache 316 comprises a region of a physical memory used to temporarily store particular data that is likely to be used again. The cache 316 can include a pool of data entries. In some examples, the cache 316 can be configured to operate according to a write-back policy in which data is written to the cache without being concurrently written to the first memory device 318. Accordingly, in some embodiments, data written to the cache 316 may not have a corresponding data entry in the first memory device 318.

In an example, the controller 312 can receive write requests (e.g., from the host device 302) involving the cache 316 and cause data associated with each of the write requests to be written to the cache 316. In some examples, the controller 312 can receive the write requests at a rate of thirty-two (32) gigatransfers (GT) per second, such as according to or using a CXL protocol. The controller 312 can similarly receive read requests and cause data stored in, e.g., the first memory device 318 or the second memory device 320, to be retrieved and written to, for example, the host device 302 via an interface 306.

In an example, the interface 306 can include any type of communication path, bus, or the like that allows information to be transferred between the host device 302 and the memory system 304. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. In an example, the interface 306 includes a PCIe 5.0 interface that is compliant with the compute express link (CXL) protocol standard. Accordingly, in some embodiments, the interface 306 supports transfer speeds of at least 32 GT/s.

As similarly described elsewhere herein, CXL is a high-speed central processing unit (CPU)-to-device or CPU-to-memory interconnect designed to enhance compute performance. CXL technology maintains memory coherency between a CPU memory space (e.g., the host memory 308) and memory on attached devices or accelerators (e.g., the first memory device 318 or the second memory device 320), which allows resource sharing for higher performance, reduced software stack complexity, and lower overall system cost. CXL is designed to be an industry open standard interface for high-speed communications as accelerators are increasingly used to complement CPUs in support of emerging data-rich and compute-intensive applications such as artificial intelligence and machine learning.

Figure 4:
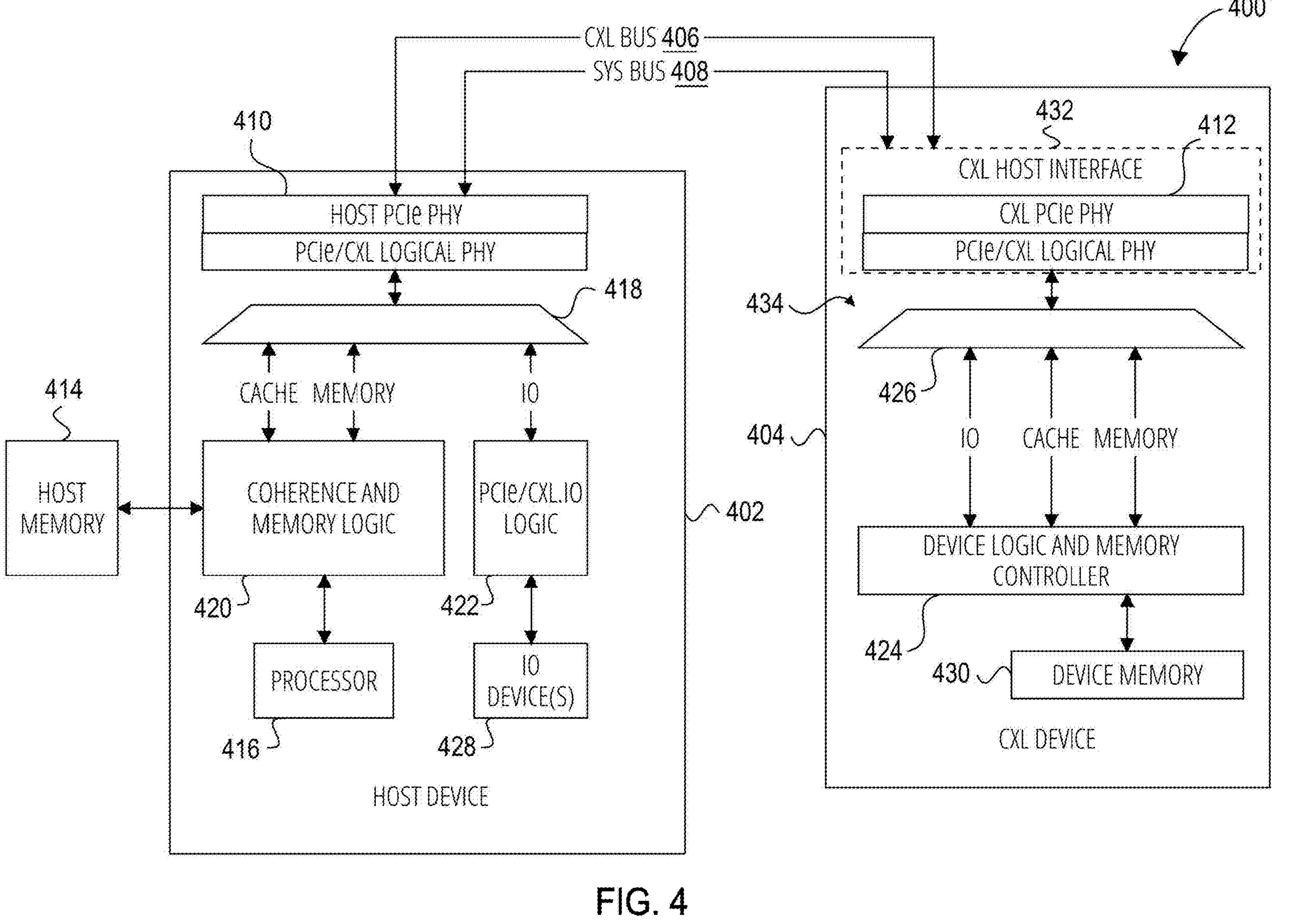
FIG. 4 illustrates generally an example of a compute express link (CXL) system.

FIG. 4 illustrates generally an example of a CXL system 400 that uses a bus system, including a CXL link bus 406 and a system management bus 408, to connect a host device 402 and a CXL device 404. In an example, the host device 402 comprises or corresponds to the host device 302 and the CXL device 404 comprises or corresponds to the memory system 304 from the example of the computing system 300 in FIG. 3. A memory system command manager (CM) can comprise a portion of the host device 402 or the CXL device 404.

In an example, the system management bus 408 (e.g., corresponding to a portion of the interface 306 from the example of FIG. 3) is configured to support main-band or side-band communications between the host device 402 and the CXL device 404. The system management bus 408 can carry miscellaneous commands or events using PCIe and CXL protocols, such as link speed changes, reset commands issued by the host, and other reliability, availability, and serviceability features.

In an example, the CXL link bus 406 (e.g., corresponding to a portion of the interface 306 from the example of FIG. 3) can support communications using multiplexed protocols for caching (e.g., CXL.cache), memory accesses (e.g., CXL.mem or CXL.memory), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 414) using a request and response protocol. CXL.memory can enable the host device 402 to use memory attached to the CXL device 404, for example, in or using a virtualized memory space. The CXL-based memory device can include or use a volatile or non-volatile memory such as can be characterized by different speeds or latencies. In an example, the CXL-based memory device can include a CXL-based memory controller configured to manage transactions with the volatile or non-volatile memory.

CXL.memory transactions can be memory load and store operations that run downstream from or outside of the host device 402. CXL memory devices can have different levels of complexity. For example, a simple CXL memory system can include a CXL device that includes, or is coupled to, a single media controller, such as a memory controller (MEMC). A moderate CXL memory system can include a CXL device that includes, or is coupled to, multiple media controllers. A complex CXL memory system can include a CXL device that includes, or is coupled to, a cache controller (and its attendant cache) and to one or more media or memory controllers.

In the example of FIG. 4, the host device 402 includes a host processor 416 (e.g., comprising one or more CPUs or cores) and IO device(s) 428. The host device 402 can comprise, or can be coupled to, host memory 414. The host device 402 can include various circuitry or logic configured to facilitate CXL-based communications and transactions with the CXL device 404. For example, the host device 402 can include coherence and memory logic 420 configured to implement transactions according to CXL.cache and CXL.memory semantics, and the host device 402 can include PCIe logic 422 configured to implement transactions according to CXL.io semantics. In an example, the host device 402 can be configured to manage coherency of data cached at the CXL device 404 using, e.g., its coherence and memory logic 420.

The host device 402 can further include a host multiplexer 418 configured to modulate communications over the CXL link bus 406 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 402, such as using the coherence and memory logic 420.

CXL devices can include devices with various different architectures and capabilities. For example, a Type 1 CXL device can be a device configured to implement a fully coherent cache without host management. Transaction types used with Type 1 devices can include device-to-host (D2H) coherent transactions and host-to-device (H2D) snoop transactions, among others. A Type 2 CXL device, such as can include or use an attached high-bandwidth memory, can be configured to optionally implement coherent cache and can be host-managed. CXL.cache and CXL.mem transactions are generally supported by Type 2 devices. A Type 3 CXL device, such as a memory expander for the host, can be configured to include or use host-managed memory. A Type 3 device supports CXL.mem transactions.

The CXL device 404 can include various components or logical blocks including a CXL host interface 432 and a device management system 434. In an example, the CXL host interface 432 can be configured to receive and manage various requests and transactions. For example, the CXL host interface 432 can be configured to receive and communicate PCIe resets such as using PERST (PCI Express Reset), Hot Reset, FLR (function level reset), and CXL resets. In an example, the CXL host interface 432 can be configured to receive and communicate DOE Transaction layer packets. In an example, the CXL host interface 432 can be configured to handle side-band requests or other miscellaneous events from PCIe and CXL devices, such as using the CXL link bus 406 or the system management bus 408.

The CXL host interface 432 can include or use multiple CXL interface physical layers 412. The device management system 434 can include, among other things, the device logic and memory controller 424. In an example, the CXL device 404 can comprise a device memory 430, or can be coupled to another memory device. The CXL device 404 can include various circuitry or logic configured to facilitate CXL-based communications and transactions with the host device 402 using the CXL link bus 406. For example, the device logic and memory controller 424 can be configured to implement transactions received using the CXL host interface 432 according to CXL.cache, CXL.memory, and CXL.io semantics. The CXL device 404 can include a CXL device multiplexer 426 configured to control communications over the CXL link bus 406.

In an example, one or more of the coherence and memory logic 420, the device management system 434, and the device logic and memory controller 424 comprises a compute fabric with various functional units such as a command manager (CM), or other unit. The compute fabric can be reconfigurable and can include separate synchronous and asynchronous flows.

The device management system 434 or the device logic and memory controller 424 or portions thereof can be configured to operate in an application space of the CXL system 400 and, in some examples, can initiate its own threads or sub-threads, which can operate in parallel and can optionally use resources or units on other CXL devices 404. Queue and transaction control through the system can be coordinated by the CM, for example. In an example, each queue or thread can map to a different loop iteration to thereby support multi-dimensional loops. With the capability to initiate such nested loops, among other capabilities, the system can realize significant time savings and latency improvements for compute-intensive operations.

In an example, command fencing can be used to help maintain order throughout such operations, which can be performed locally or throughout a compute space of the device logic and memory controller 424. In some examples, the CM can be used to route commands to a particular command execution unit (e.g., comprising the device logic and memory controller 424 of a particular instance of the CXL device 404) using an unordered interconnect that provides respective transaction identifiers (TID) to command and response message pairs.

In an example, the CM can coordinate a synchronous flow, such as using an asynchronous fabric of the reconfigurable compute fabric to communicate with other synchronous flows and/or other components of the reconfigurable compute fabric using asynchronous messages. For example, the CM can receive an asynchronous message from a dispatch interface and/or from another flow controller instructing a new thread at or using a synchronous flow. The dispatch interface may interface between the reconfigurable compute fabric and other system components. In some examples, a synchronous flow may send an asynchronous message to the dispatch interface to indicate completion of a thread.

Asynchronous messages can be used by synchronous flows such as to access memory. For example, the reconfigurable compute fabric can include one or more memory interfaces. Memory interfaces are hardware components that can be used by a synchronous flow or components thereof to access an external memory that is not part of the synchronous flow but is accessible to the host device 402 or the CXL device 404. A thread executed using a synchronous flow can include sending a read and/or write request to a memory interface. Because reads and writes are asynchronous, the thread that initiates a read or write request to the memory interface may not receive the results of the request. Instead, the results of a read or write request can be provided to a different thread executed at a different synchronous flow. Delay and output registers in one or more of the CXL devices 404 can help coordinate and maximize efficiency of a first flow, for example, by precisely timing engagement of particular compute resources of one device with arrival of data relevant to the first flow. The registers can help enable the particular compute resources of the same resource to be repurposed for flows other than the first flow, for example while the first flow dwells or waits for other data or operations to complete. Such other data or operations can depend on one or more other resources of the fabric.

Figure 5:
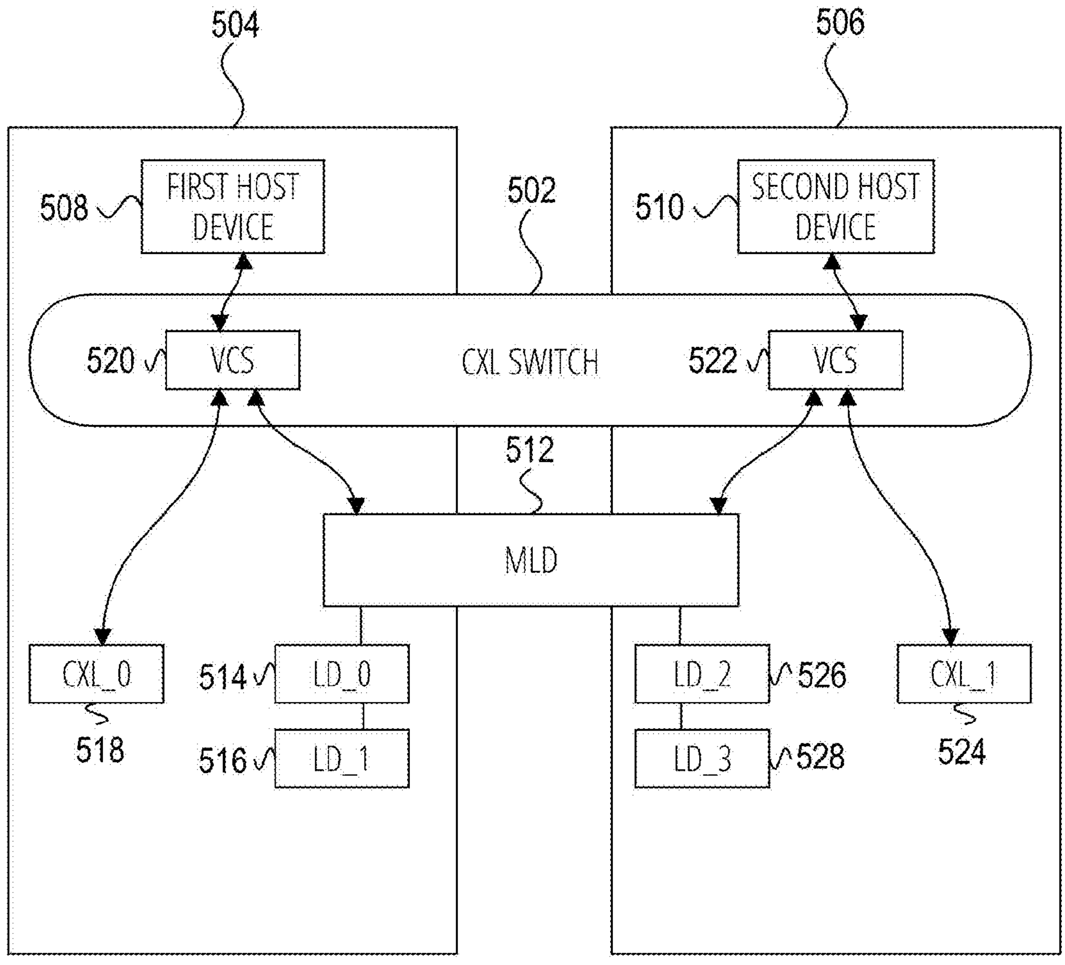
FIG. 5 illustrates generally an example of a CXL system implementing a virtual hierarchy for managing transactions.

FIG. 5 illustrates generally an example of a portion of a CXL system that can include or use a virtual hierarchy for managing transactions, such as memory transactions with a CXL memory device. The example can include or use real-time telemetry to help facilitate allocation of new or ongoing queues. The example of FIG. 5 includes a first virtual hierarchy 504 and a second virtual hierarchy 506. The first virtual hierarchy 504, the second virtual hierarchy 506, or one or more modules or components thereof can be implemented using the host device 402, the CXL device 404, or multiple instances of the host device 402 or the CXL device 404.

In the example of FIG. 5, the first virtual hierarchy 504 includes a first host device 508 and the second virtual hierarchy 506 includes a second host device 510. A CXL switch 502 can be provided to expose multiple CXL resources to different hosts in the system. In other words, the CXL switch 502 can be configured to couple each of the first host device 508 and the second host device 510 to the same or different resources, such as using respective virtual CXL switches (VCS), such as a first VCS 520 and a second VCS 522, respectively. The CXL switch 502 can be statically configured to couple each host device to respective different resources or the CXL switch 502 can be dynamically configured to the different resources, such as depending on the needs of a particular one of the host devices to execute its respective queues or threads. Accordingly, the CXL switch 502 enables virtual hierarchies and resource sharing among different hosts.

In an example, a fabric manager (FM) can be provided to assign or coordinate connectivity of the CXL switch 502 and can be configured to initiate, dissolve, or reconfigure the virtual hierarchies of the CXL system. The FM can include a baseboard management controller (BMC), an external controller, a centralized controller, or other controller.

In the example of FIG. 5, the CXL switch 502, or the first VCS 520 or the second VCS 522, can coordinate communication between the host devices and various accelerators or other CXL devices. For example, the CXL switch 502 can be coupled to various CXL devices (e.g., a first CXL device 518 or a second CXL device 524), or to various logical devices, such as a single logical device (LD, e.g., a first LD 514, a second LD 516, a third LD 526, or a fourth LD 528) via a multiple logic device (MLD, e.g., an MLD 512). Each CXL device and logical device can represent a respective accelerator or CXL device with its own respective CXL.io configuration space, CXL.mem memory space, and CXL-.cache cache space.

Figure 6A:
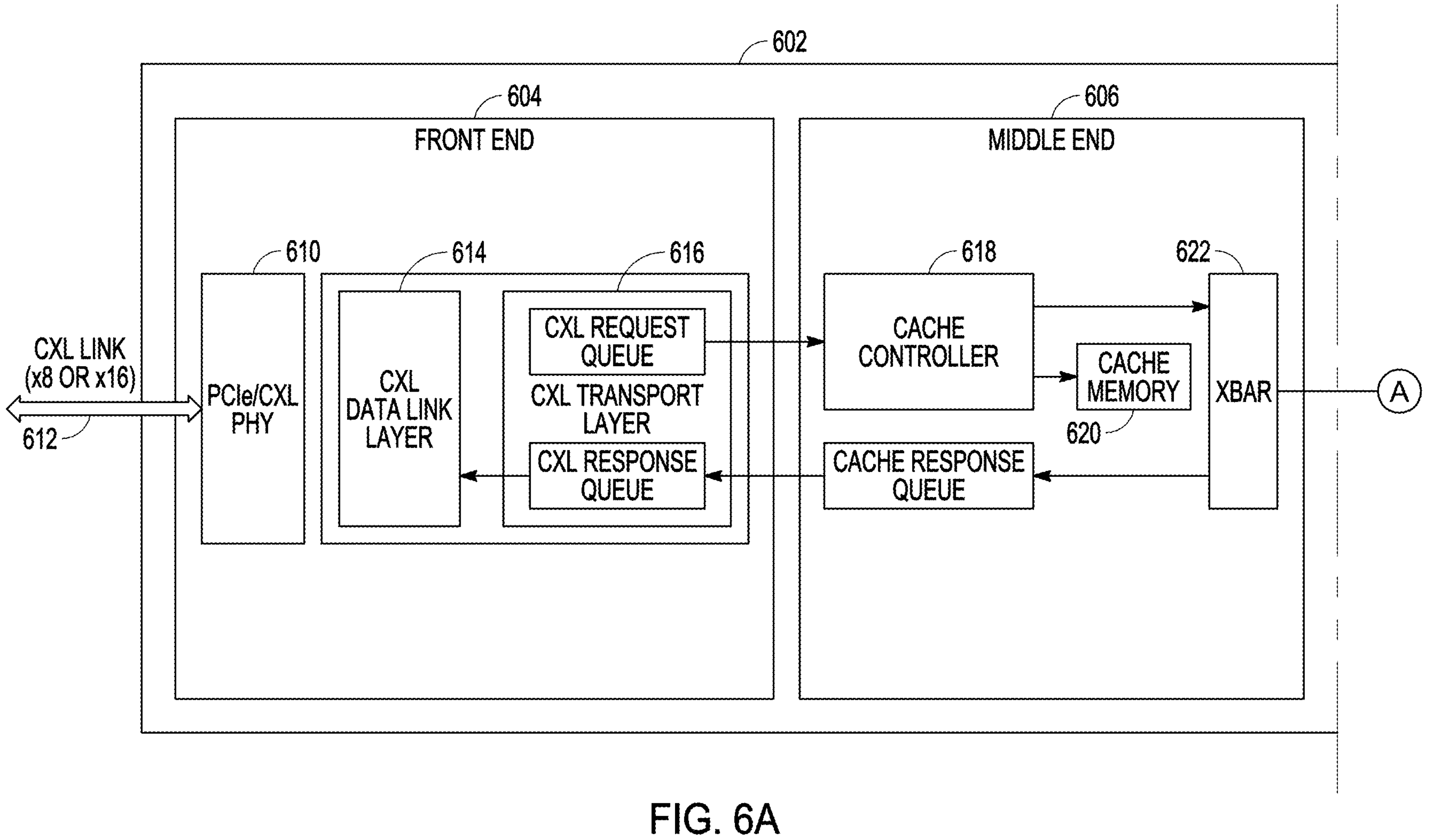
FIG. 6A and FIG. 6B illustrate generally an example of a CXL memory device.
Figure 6B:
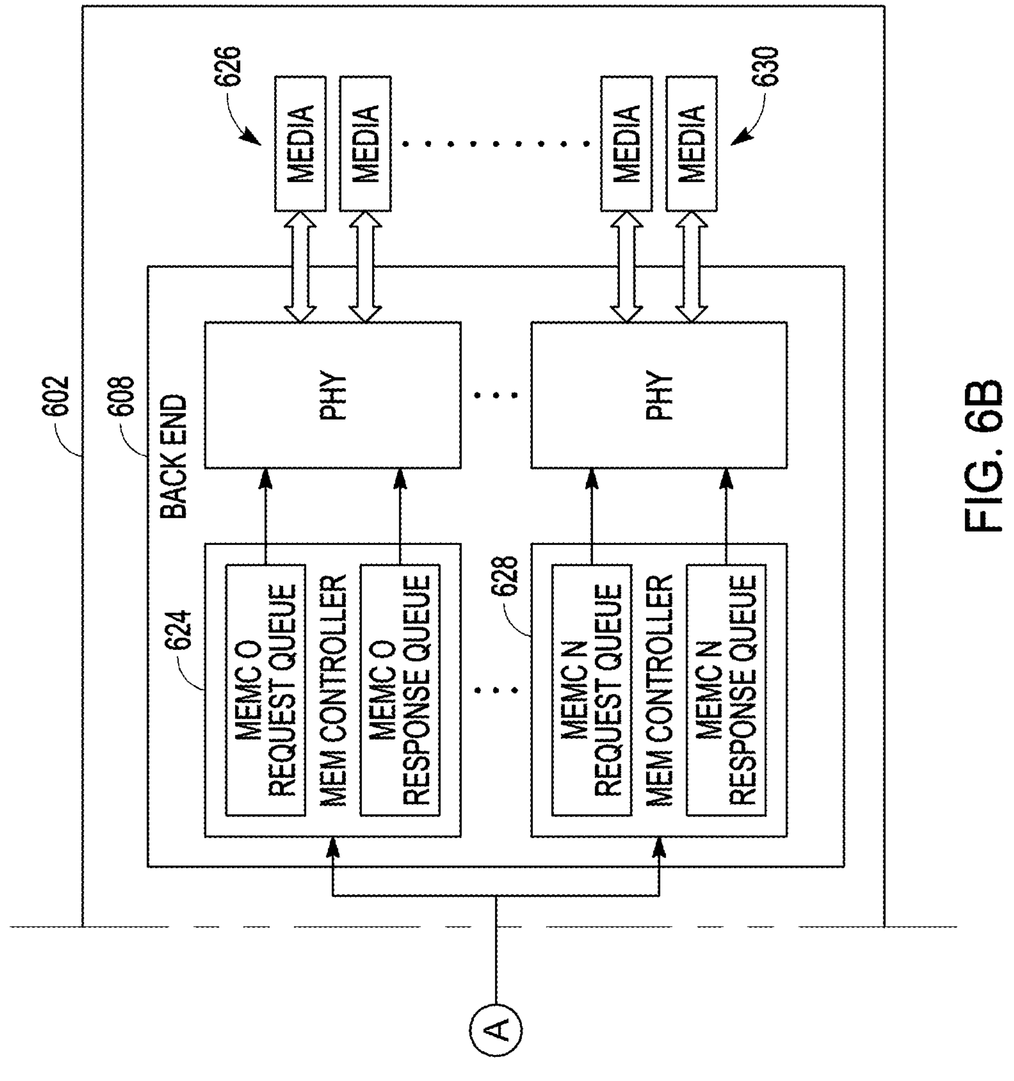

FIG. 6A and FIG. 6B illustrate generally an example of a CXL device 602 such as a memory device. In an example, the CXL device 602 includes a CXL controller that manages transactions with the host and the CXL device 602 includes a memory controller that manages transactions with a memory. The memory can include or use volatile memory such as DRAM, SDRAM, PCRAM, RRAM, among other kinds of memory. The memory can additionally or alternatively include or use non-volatile memory, such as NAND or NOR flash memory. Although the host and other CXL devices are discussed in various examples herein as a “CXL” host device and a “CXL” accelerator or “CXL” device, other types of hosts and accelerators can similarly be used without including or using CXL protocols.

In an example, the CXL device 602 is a type of accelerator device configured to communicate with one or more hosts via a CXL interface, such as using transactions defined by CXL.io, CXL.mem, and CXL.cache protocols. The CXL device 602 can include a Type 3 CXL device, such as including a memory device with one or multiple memories, such as can include memories of the same type or of different types (e.g., memories exhibiting respective different latency characteristics).

For ease of illustration and discussion, the example of the CXL device 602 includes a notional front-end portion 604, a middle-end portion 606, and a back-end portion 608. The portions and components thereof of the CXL device 602 can be differently configured or combined according to different implementations of the CXL device 602.

In the example of FIG. 6A, the front-end portion 604 can include a CXL link 612 configured to use a physical layer, CXL PCIe PHY layer 610, to interface with a host device. The front-end portion 604 can further include a CXL data link layer 614 and a CXL transport layer 616 configured to manage transactions between the CXL device 602 and the host. In an example, the CXL transport layer 616 comprises registers and operators configured to manage CXL request queues (e.g., comprising one or more memory transaction requests) and CXL response queues (e.g., comprising one or more memory transaction responses) for the CXL device 602.

In an example, the CXL device 602 can include a memory device that includes a cache (e.g., comprising SRAM) and includes longer-term volatile or non-volatile memory accessible via a memory controller. In the example of FIG. 6A and FIG. 6B, the CXL device 602 includes a cache memory 620 in the middle-end portion 606 of the device. The middle-end portion 606 can include a cache controller 618 configured to monitor requests from the CXL transport layer 616 and identify requests that can be fulfilled using the cache memory 620.

Various complexities can arise in CXL systems. For example, CXL transactions can be based on a relatively large transaction size (e.g., 64 bytes), while some processes may use more granularity or smaller data sizes. Accordingly, in some examples, the cache controller 618 can be included or used in the CXL device 602 to store excess data fetched from backend media controllers or memories, such as from one or more memories in the back-end portion 608 of the CXL device 602.

In a particular example, such as including or using the CXL device 602 with DDR4 or DDR5 attached memory, sideband ECC can be supported or used to help protect data integrity. When the transaction size is 64 bytes, a relatively large amount of ECC data can be retrieved at once, while only a portion of the ECC data may be used for a particular transaction. The excess ECC data can be stored using the cache memory 620 for more efficient access, thereby helping reduce latency for future transactions.

In an example, the cache controller 618 is coupled to a cross-bar interface or XBAR interface 622. The XBAR interface 622 can be configured to allow multiple requesters to access multiple memory controllers in parallel, such as including multiple memory controllers in the back-end portion 608 of the CXL device 602. In an example, the XBAR interface 622 provides essentially point-to-point access between the requestor and memory controller and provides generally higher performance than would be available using a conventional bus architecture. The XBAR interface 622 can be configured to receive responses from the back-end portion 608 or receive cache hits from the cache memory 620 and deliver the responses to the front-end portion 604 using a cache response queue.

At FIG. 6B, the back-end portion 608 of the CXL device 602 includes multiple memory controllers, including a first memory controller 624 through a Nth memory controller 628. Each of the memory controllers can have or use respective memory request and response queues. Each of the memory controllers can be coupled to respective media or memories, such as can comprise volatile or non-volatile memory. In the illustrated example, the first memory controller 624 is coupled to a first memory 626 and the Nth memory controller 628 is coupled to a Nth memory 630.

In an example, each of the multiple memory controllers in the system can manage its own respective queues. In some examples, different memory controllers can be configured to use or interface with memories having respective different latency characteristics. Accordingly, performance optimization can include coordination of the respective queues of each memory controller. Informed coordination can be based on, for example, request and response path information for each memory controller.

In an example, the memory device of the CXL device 602 can include a memory array that does not include or use on-die ECC. In this case, random errors in the memory array can be corrected at or using the memory controller (e.g., the first memory controller 624, the Nth memory controller 628, etc.). For example, the controller can be configured to use a Reed-Solomon (RS) code to identify or correct errors in data retrieved from the memory array. In an example, the controller accesses data provided by multiple dies (e.g., 18 dies) that are accessed in parallel (e.g., using a 72-bit channel). For example, each die can use multiple data in or data out pins (DQ pins), such as four pins per die. In an example that can include a CXL memory device, the minimum transaction size can be 64 bytes. Accordingly, in an 18 die device where 2 dies comprise parity information (e.g., Reed-Solomon code data), each die provides 4 bytes of data to thereby provide a 64 byte transaction or block of data.

Figure 7:
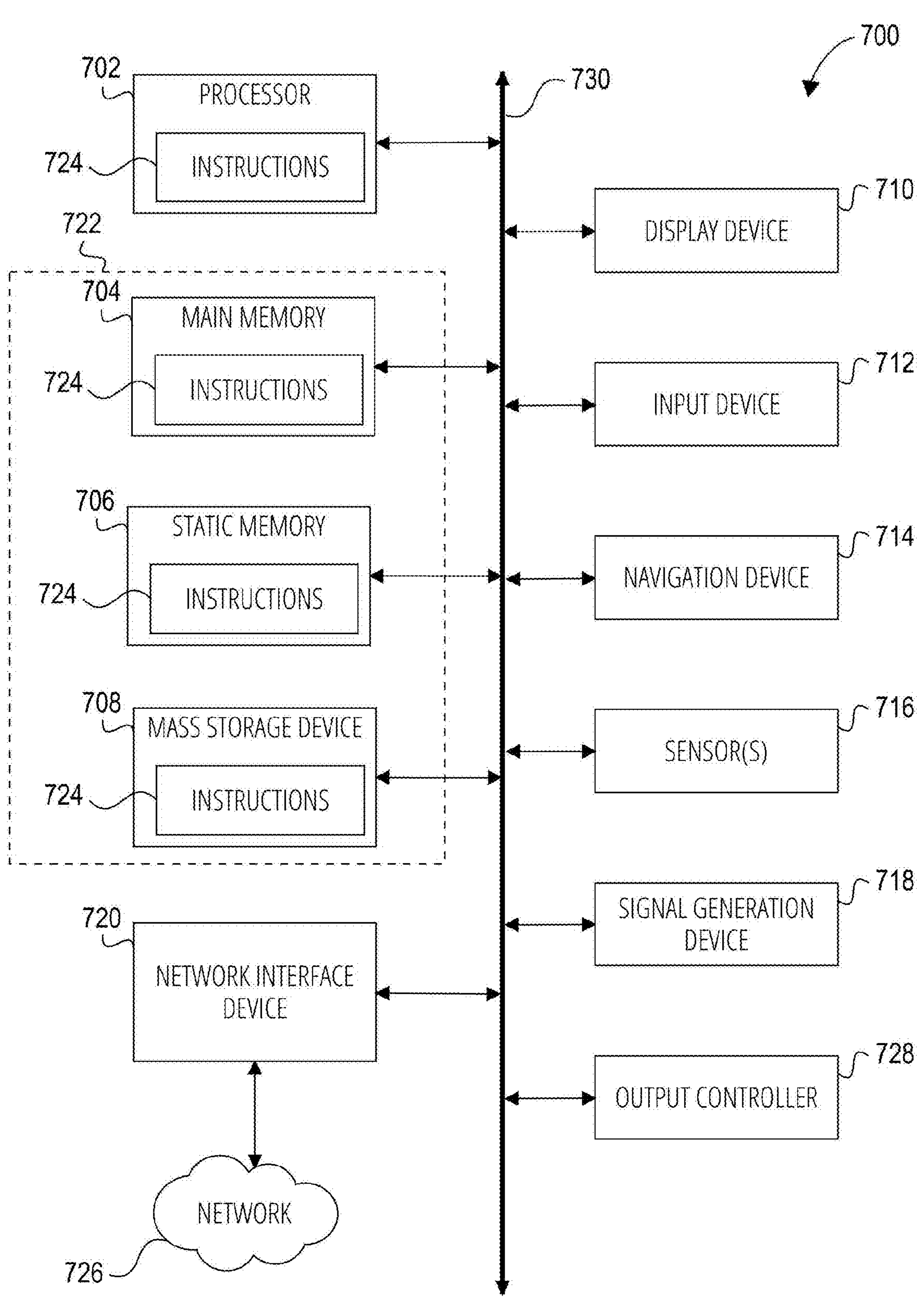
FIG. 7 illustrates a block diagram of an example machine with which, in which, or by which any one or more of the techniques discussed herein can be implemented.

FIG. 7 illustrates a block diagram of an example machine 700 with which, in which, or by which any one or more of the techniques (e.g., methodologies) discussed herein can be implemented. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership (e.g., as belonging to a host-side device or process, or to an accelerator-side device or process) can be flexible over time. Circuitries include members that can, alone or in combination, perform specified operations when operating. In an example, hardware of the circuitry can be immutably designed to carry out a specific operation (e.g., hardwired) for example using the device logic and memory controller 424, or a host interface circuit, or using a specific command execution unit thereof, such as to monitor or track correctable errors in a memory device and, based on a correctable error pattern, selectively allow or disallow scrub operations to help mitigate or avoid future uncorrectable errors in problematic die areas. In an example, the hardware of the circuitry can include variably connected physical components (e.g., command execution units, transistors, simple circuits, etc.) including a machine-readable (e.g., processor-readable) medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in the peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

Any one or more of the components of the machine 700 can include or use one or more instances of the host device 402 or the CXL device 404 or other component in or appurtenant to the computing system 300. The machine 700 (e.g., computer system) can include a hardware processor 702 (e.g., the host processor 416, the device logic and memory controller 424, a central processing unit (CPU), a graphics processing unit (GPU), a hardware processor core, or any combination thereof), a main memory 704, a static memory 706 (e.g., memory or storage for firmware, microcode, a basic-input-output (BIOS), unified extensible firmware interface (UEFI), etc.), and mass storage device 708 or memory die stack, hard drives, tape drives, flash storage, or other block devices) some or all of which can communicate with each other via an interlink 730 (e.g., bus). The machine 700 can further include a display device 710, an alphanumeric input device 712 (e.g., a keyboard), and a user interface (UI) Navigation device 714 (e.g., a mouse). In an example, the display device 710, the input device 712, and the UI navigation device 714 can be a touch screen display. The machine 700 can additionally include a mass storage device 708 (e.g., a drive unit), a signal generation device 718 (e.g., a speaker), a network interface device 720, and one or more sensor(s) 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 702, the main memory 704, the static memory 706, or the mass storage device 708 can be, or include, a machine-readable media 722 on which is stored one or more sets of data structures or instructions 724 (e.g., software) embodying or used by any one or more of the techniques or functions described herein. The instructions 724 can also reside, completely or at least partially, within any of registers of the hardware processor 702, the main memory 704, the static memory 706, or the mass storage device 708 during execution thereof by the machine 700. In an example, one or any combination of the hardware processor 702, the main memory 704, the static memory 706, or the mass storage device 708 can constitute the machine-readable media 722. While the machine-readable media 722 is illustrated as a single medium, the term "machine-readable medium" can include a single medium or multiple media (e.g., a centralized or distributed database, or associated caches and servers) configured to store the one or more instructions 724.

The term "machine-readable medium" (or, equivalently, "processor-readable medium") can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine-readable media 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine-readable media 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine-readable medium.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 320 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Other Notes and Examples

Example 1 is a memory device comprising one or more integrated circuit (IC) memory dies configured as a memory array, and a memory controller to control access to the memory array, the memory controller configured to: receive an insertion notification related to near-memory telemetry data, collect the near-memory telemetry data based on the insertion notification, include the near-memory telemetry data in a log stored in a memory array of the memory device, and send the logged near-memory telemetry data to a host device.

In Example 2, the subject matter of Example 1 includes wherein the near-memory telemetry data includes one or more of interface or internal memory bandwidth measurements.

In Example 3, the subject matter of Examples 1-2 includes wherein the near-memory telemetry data includes one or more of interface or internal memory latency measurements.

In Example 4, the subject matter of Examples 1-3 includes wherein the near-memory telemetry data includes queue occupancy of the memory device.

In Example 5, the subject matter of Examples 1-4 includes wherein the near-memory telemetry data includes a memory-side cache hit rate.

In Example 6, the subject matter of Examples 1-5 includes wherein the near-memory telemetry data includes near-memory computing (NMC) telemetry data self-generated by a user-defined function.

Example 7 is a method of operating a memory device, the method comprising receiving, by a memory controller of the memory device, an insertion notification related to near-memory telemetry data, collecting, by the memory controller, the near-memory telemetry data based on the insertion notification, including, by the memory controller, the near-memory telemetry data in a log stored in a memory array of the memory device, and sending, by the memory controller, the logged near-memory telemetry data to a host device.

In Example 8, the subject matter of Example 7 includes wherein the insertion notification is based on a special memory request from the host device.

In Example 9, the subject matter of Examples 7-8 includes wherein the insertion notification is based on a programmable timer of the memory device.

In Example 10, the subject matter of Examples 7-9 includes wherein the insertion notification is based on a decision of a near-memory computing (NMC) device.

In Example 11, the subject matter of Examples 7-10 includes wherein the insertion notification includes an encoded sequence of addresses from the host device.

In Example 12, the subject matter of Examples 7-11 includes wherein the insertion notification includes an indication of a subset of telemetry data to be collected.

In Example 13, the subject matter of Examples 7-12 includes wherein the insertion notification includes an indication of a type of telemetry data to be collected.

In Example 14, the subject matter of Examples 7-13 includes wherein the insertion notification includes a unique identifier configured to align current code execution with the near-memory telemetry data.

In Example 15, the subject matter of Example 14 includes wherein the unique identifier includes a host process program counter (PC) and process identification (PID).

In Example 16, the subject matter of Examples 14-15 includes wherein the unique identifier includes a programmer-defined unique sequence.

In Example 17, the subject matter of Examples 14-16 includes wherein the near-memory telemetry data is tagged with the unique identifier when inserting the near-memory telemetry data in the log.

Example 18 is a computer system comprising at least one host device including a host processor, a memory bus and a host input/output (I/O) channel, and at least one memory device coupled to the at least one host device by the memory bus and host I/O channel, wherein the at least one memory device includes: one or more integrated circuit (IC) memory dies configured as a memory array, and a memory controller to control access to the memory array, the memory controller configured to: receive an insertion notification related to near-memory telemetry data, wherein the insertion notification includes a unique identifier configured to align current code execution with the near-memory telemetry data, collect the near-memory telemetry data based on the insertion notification, include the near-memory telemetry data in a log stored in the memory array of the at least one memory device, wherein the near-memory telemetry data is tagged with the unique identifier when inserting the near-memory telemetry data in the log, and send the logged near-memory telemetry data to a host device.

In Example 19, the subject matter of Example 18 includes wherein the unique identifier includes a host process program counter (PC) and process identification (PID).

In Example 20, the subject matter of Examples 18-19 includes wherein the unique identifier includes a programmer-defined unique sequence.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device comprising:

one or more integrated circuit (IC) memory dies configured as a memory array; and a memory controller to control access to the memory array, the memory controller configured to:

receive an insertion notification related to near-memory telemetry data, wherein the insertion notification includes a unique identifier including a host process program counter (PC) and process identification (PID);

collect the near-memory telemetry data based on the insertion notification;

include the near-memory telemetry data in a log stored in a memory array of the memory device; and send the logged near-memory telemetry data to a host device.

2. The memory device of claim 1, wherein the near-memory telemetry data includes one or more of interface or internal memory bandwidth measurements.

3. The memory device of claim 1, wherein the near-memory telemetry data includes one or more of interface or internal memory latency measurements.

4. The memory device of claim 1, wherein the near-memory telemetry data includes queue occupancy of the memory device.

5. The memory device of claim 1, wherein the near-memory telemetry data includes a memory-side cache hit rate.

6. The memory device of claim 1, wherein the near-memory telemetry data includes near-memory computing (NMC) telemetry data self-generated by a user-defined function.

7. A method of operating a memory device, the method comprising:

receiving, by a memory controller of the memory device, an insertion notification related to near-memory telemetry data;

collecting, by the memory controller, the near-memory telemetry data based on the insertion notification, wherein the insertion notification includes an encoded sequence of addresses from the host device;

including, by the memory controller, the near-memory telemetry data in a log stored in a memory array of the memory device; and sending, by the memory controller, the logged near-memory telemetry data to a host device.

8. The method of claim 7, wherein the insertion notification is based on a special memory request from the host device.

9. The method of claim 7, wherein the insertion notification is based on a programmable timer of the memory device.

10. The method of claim 7, wherein the insertion notification is based on a decision of a near-memory computing (NMC) device.

11. The method of claim 7, wherein the insertion notification includes an indication of a subset of telemetry data to be collected.

12. The method of claim 7, wherein the insertion notification includes an indication of a type of telemetry data to be collected.

13. The method of claim 7, wherein the insertion notification includes a unique identifier configured to align current code execution with the near-memory telemetry data.

14. The method of claim 13, wherein the unique identifier includes a host process program counter (PC) and process identification (PID).

15. The method of claim 13, wherein the unique identifier includes a programmer-defined unique sequence.

16. The method of claim 13, wherein the near-memory telemetry data is tagged with the unique identifier when inserting the near-memory telemetry data in the log.

17. A computer system comprising:

at least one host device including a host processor;

a memory bus and a host input/output (I/O) channel; and at least one memory device coupled to the at least one host device by the memory bus and host I/O channel, wherein the at least one memory device includes:

one or more integrated circuit (IC) memory dies configured as a memory array; and a memory controller to control access to the memory array, the memory controller configured to:

receive an insertion notification related to near-memory telemetry data, wherein the insertion notification includes a unique identifier configured to align current code execution with the near-memory telemetry data, and wherein the unique identifier includes a programmer-defined unique sequence;

collect the near-memory telemetry data based on the insertion notification;

include the near-memory telemetry data in a log stored in the memory array of the at least one memory device, wherein the near-memory telemetry data is tagged with the unique identifier when inserting the near-memory telemetry data in the log; and send the logged near-memory telemetry data to a host device.

18. The computer system of claim 17, wherein the unique identifier includes a host process program counter (PC) and process identification (PID).

* * * * *